(12) United States Patent
Dalton

(10) Patent No.: US 6,332,850 B1
(45) Date of Patent: Dec. 25, 2001

(54) GOLF BALL CORES WITH IMPROVED DURABILITY

(75) Inventor: Jeffrey L. Dalton, Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/660,595

(22) Filed: Sep. 13, 2000

Related U.S. Application Data

(62) Division of application No. 09/259,878, filed on Mar. 1, 1999, now Pat. No. 6,120,390.

(51) Int. Cl.⁷ .............................. A63B 37/04; A63B 37/06
(52) U.S. Cl. ......................... 473/371; 473/376; 473/373; 473/374
(58) Field of Search .................... 473/357, 361, 473/363, 364, 365, 377, 367, 368, 370, 371, 373, 374, 376, 378

(56) References Cited

U.S. PATENT DOCUMENTS

| | | | |
|---|---|---|---|
| 3,384,612 | 5/1968 | Brandt et al. | 260/41 |
| 3,421,766 | 1/1969 | Chmiel et al. | 273/218 |
| 3,478,132 | 11/1969 | Randolph | 260/889 |
| 3,572,721 | 3/1971 | Harrison | 372/218 |
| 3,572,722 | 3/1971 | Harrison | 273/218 |
| 3,666,272 | 5/1972 | Walker et al. | 273/218 |
| 3,756,607 | 9/1973 | Lukinac et al. | 273/218 |
| 3,784,209 | 1/1974 | Berman et al. | 273/218 |
| 3,883,145 | 5/1975 | Cox et al. | 273/218 |
| 4,141,559 | 2/1979 | Melvin et al. | 273/220 |
| 4,266,772 | 5/1981 | Martin et al. | 273/218 |
| 4,650,193 | 3/1987 | Molitor | 273/228 |
| 4,674,170 | 6/1987 | Hubbert et al. | 29/458 |
| 4,781,383 | 11/1988 | Kamada et al. | 273/228 |
| 4,836,552 | 6/1989 | Puckett et al. | 273/218 |
| 4,844,471 | 7/1989 | Terence et al. | 273/220 |
| 4,852,884 | 8/1989 | Sullivan | 273/230 |
| 4,858,924 | 8/1989 | Saito et al. | 273/62 |
| 4,974,852 | 12/1990 | Hiraoka et al. | 273/218 |
| 5,019,319 | 5/1991 | Nakamura et al. | 273/218 |
| 5,141,233 | 8/1992 | Yuki et al. | 273/218 |
| 5,143,957 | 9/1992 | Hasimoto et al. | 524/397 |
| 5,187,013 | 2/1993 | Sullivan | 428/407 |
| 5,222,739 | 6/1993 | Hoiuchi et al. | 273/235 R |
| 5,253,871 | 10/1993 | Viollaz | 273/228 |
| 5,368,304 | 11/1994 | Sullivan et al. | 273/220 |
| 5,407,998 | 4/1995 | Horiuchi et al. | 525/133 |
| 5,439,227 | 8/1995 | Egashira et al. | 273/228 |
| 5,482,285 | 1/1996 | Yabuki et al. | 273/228 |
| 5,543,367 | 8/1996 | Hamada et al. | 525/207 |
| 5,553,852 | 9/1996 | Higuchi et al. | 473/373 |
| 5,565,524 | 10/1996 | Hamada et al. | 525/208 |
| 5,574,107 | 11/1996 | Hiraoka et al. | 525/193 |
| 5,580,057 | 12/1996 | Sullivan et al. | 473/377 |
| 5,601,502 | 2/1997 | Hiraoka et al. | 473/373 |
| 5,607,366 | 3/1997 | Yokota et al. | 473/372 |
| 5,633,322 | 5/1997 | Yabuki et al. | 473/365 |
| 5,663,235 | 9/1997 | Tanaka | 525/201 |
| 5,679,745 | 10/1997 | Hamada et al. | 525/195 |
| 5,681,898 | 10/1997 | Pocklington | 525/193 |
| 5,683,312 | 11/1997 | Boehm et al. | 473/354 |
| 5,688,191 | 11/1997 | Cavallaro et al. | 473/373 |
| 5,695,413 | 12/1997 | Yamagishi et al. | 473/374 |
| 5,704,854 | 1/1998 | Higuchi et al. | 473/373 |
| 5,711,723 | 1/1998 | Hiraoka et al. | 473/374 |
| 5,733,205 | 3/1998 | Higuchi et al. | 473/376 |
| 5,733,206 | 3/1998 | Nesbitt et al. | 473/377 |
| 5,733,207 | 3/1998 | Sullivan et al. | 473/377 |
| 5,733,974 | 3/1998 | Yamada et al. | 525/72 |
| 5,743,814 | 4/1998 | Endo | 473/374 |
| 5,743,816 | 4/1998 | Ohsumi et al. | 473/376 |
| 5,779,561 | 7/1998 | Sullivan et al. | 473/373 |
| 6,057,403 | * 5/2000 | Sullivan et al. | 525/221 |
| 6,071,201 | * 6/2000 | Maruko | 473/373 |
| 6,120,390 | * 9/2000 | Dalton | 473/351 |
| 6,245,859 | * 6/2001 | Sullivan et al. | 525/330.2 |
| 2001/0005699 | * 6/2001 | Morgan et al. | 473/376 |

* cited by examiner

*Primary Examiner*—Sebastiano Passaniti
*Assistant Examiner*—Alvin A. Hunter, Jr.
(74) *Attorney, Agent, or Firm*—Pennie & Edmonds LLP

(57) ABSTRACT

The present invention is directed toward more durable golf ball cores and more durable golf balls. The golf balls of this invention comprise a cover and a core wherein the core may further comprise a center and one or more layers of a mantle disposed between the center and the cover. The core, the mantle or the layers of the mantle, comprise a mixture of one or more thermoset rubber materials and at least one compatible, modified, non-ionic polyolefin. The non-ionic polyolefin that is modified may be a homopolymer, copolymer, terpolymer, block copolymer or a mixture thereof that is present at about 0.5 to about 10 parts per hundred of the thermoset rubber material used in the core or core layer.

15 Claims, No Drawings

GOLF BALL CORES WITH IMPROVED DURABILITY

The present application is a divisional application of application Ser. No. 09/259,878, filed Mar. 1, 1999, to be issued as U.S. Pat. No. 6,120,390, which is incorporated by reference herein its entirety.

FIELD OF THE INVENTION

This invention relates generally to golf balls, and, more specifically, to two-piece golf balls with solid or filled cores, as well as to multi-piece golf balls having a wound core or a multi piece core including one or more mantle layers. The composition of the core and/or the one or more mantle layers includes a blend of one or more elastomers with one or more non-ionic, modified polyolefins compatible with the one or more elastomers, providing golf ball cores and, consequently, golf balls with improved durability.

BACKGROUND OF THE INVENTION

Golf balls are available as one-piece, two-piece, and multi-layer constructions. One-piece balls lack a separate cover layer and, typically, are formed by molding a polybutadiene based compound in a single step. One-piece balls typically spin at a high rate, have a relatively low linear velocity, and, generally, do not provide the desired driving distance. Consequently, one-piece balls are used most frequently as practice balls or driving range balls.

Two-piece golf balls usually have a core formed of a solid sphere, typically comprising a polybutadiene based compound, and a cover comprising SURLYN® (DuPont) or other similar ionomeric resin material that encases the core. Ionomeric resin covers, when molded over a solid, one-piece core, are more durable than the softer balata covers on golf balls that are preferred by professional golfers. Two-piece golf balls provide superior distance when driven as compared to one-piece golf balls, and are frequently used by the typical amateur golfer.

Multi-layer golf balls encompass those with cores or covers composed of two or more layers. A golf ball with a dual-layer core comprises a core and a cover which encases the core. The core, in turn, is composed of an inner sphere, referred to as the center, and at least one additional layer, referred to as an outer core layer or a mantle layer, disposed concentrically between the center and the cover. Similarly, golf balls may be constructed with a multi-layer cover. Inner cover layers are formed over the core and are disposed concentrically between the center and the outer cover layer or layers. Generally, the distinction between an inner cover layer and an outer mantle layer has been that the former is often constructed with a thermoplastic material while the latter is usually formed of a thermoset elastomeric material.

Typically, a spherical, solid center is formed by compression or injection molding using a thermal curing process. Outer layers making up the mantle or the layers of the mantle are formed around this center, for example by injection molding of the mantle around the center or by compression molding of two half shells comprising the mantle or mantle layer, around the center. Half shells comprising the mantle or a mantle layer may be formed by injection molding or compression molding. Ultimately, the finished multi-layer core is enclosed within the outermost layer of the ball, i.e., the cover.

Elastomers commonly used in the fabrication of golf ball cores include thermoset rubber compounds, such as polybutadiene, styrene butadiene, isoprene, trans-isoprene and natural rubber. The polymeric components comprising the core, the center, the mantle or the layers of the mantle are chemically bonded using cross linking agents and initiators. The latter materials commonly are thermosensitive peroxide-containing reagents which generate free radicals at the elevated temperatures of the curing process. The cross linking agent is usually a metallic salt of an unsaturated carboxylic acid, often, for example, zinc diacrylate.

Each layer of a dual-layer or multi-layer golf ball core may comprise mixtures that include one or more flexible or rigid polymeric materials, monomers, cross-linkers, thermally induced free radical generating systems, co-cross linkers, stabilizers, antioxidants, accelerators, fillers, dyes and other additives intended to improve the performance of, or manufacturing process for, golf balls.

The composition and properties of each layer of the golf ball can be varied independently in order to alter the physical properties of the finished golf ball. Therefore, the components that make up a golf ball may be varied alone or in combination to create a product that is matched to the skill level of the individual golfer.

Similarly, the durability of a golf ball reflects both the manner in which it is manufactured and the reagents with which it is made. It has been noted that golf ball failures frequently are the result of the formation of cracks formed within the core. In particular, in golf balls with dual-layer or multi-layer cores, it is the mantle layer which often fails. It is believed, although Applicant is not bound by this theory, that cracks within golf ball cores develop from microfissures created when the golf ball is driven. Golf balls in which the mantle layer is relatively inflexible as compared to the center, are particularly likely to develop micro-fissures and cracks upon impact. An example of this type of construction is provided by the golf ball disclosed in U.S. Pat. No. 5,601,502. The ball of the '502 patent is a three-part ball formulated with a decreased level of the cross-linking agent in the center and an increased level of the cross-linking agent in the mantle. The amount of rubber in the center, therefore, is increased relative to that in the mantle, yielding a relatively soft-centered golf ball. Although this ball has a high impact resilience, it may be less durable.

Core compositions generally include a blend of materials designed to achieve a balance between elasticity and rigidity. The former property enhances ball control and "feel" while the latter provides driving distance and strength. Components used to provide rigidity to core compositions have included ionomeric polymers as well as non-polar polymers, examples of which are disclosed in the following U.S. Patents.

U.S. Pat. No. 5,253,871 discloses the use of amide block polyethers in the construction of the mantle layer. The weak elastic modulus of the amide block polyethers results in a tendency for the balls to deform, and is corrected by adding ionomers to the blend. The mantle layer of the golf ball disclosed by the reference comprises at least 10% amide block polyether and is combined with one or more ionomers.

U.S. Pat. No. 5,439,227 discloses the use of polyether ester thermoplastic elastomers for the construction of mantle layers which can be injection molded. However, these materials require the addition of an ethylene-methacrylate copolymer at a level of up to 50 phr to provide the desired balance of hardness and impact resilience.

U.S. Pat. No. 5,681,898 discloses a mantle layer in which the polybutadiene elastomer is blended with a polymer formed between n-butyl acrylate and ethylene-methacrylate to achieve the desire combination of properties. The polymer is present in this layer at a level of at least 50 phr.

U.S. Pat. Nos. 3,384,612 and 3,421,766 disclose one-piece golf balls constructed with blends of an elastomer and an ionomer. The latter patent further discloses the addition of a second rosinous material, preferably a styrene copolymer or other non-polar material, in order to achieve the desired balance of properties in the resulting golf ball. The latter polymers were added at levels between 5 and 50 phr.

The material blends in these examples generally are combinations of elastomers and more rigid polymers. The latter materials frequently are ionomeric resins, which are ionic copolymers of an olefin and an unsaturated carboxylic acid in which at least a portion of the carboxylic acid groups have been neutralized with a metal ion. Polymers comprising acrylate monomers that have not been neutralized will, nevertheless, behave as ionomers as a result of a phenomenon referred to as "ion hopping." Blending these materials with, for example, the common cross-linking agent zinc diacrylate, would be expected to result in an exchange between the acidic protons of the carboxylic moieties of the polymer and the metal ions of the cross-linking agent.

One consequence of the ionic properties of these materials is that they are immiscible with many other, softer polymers in the same manner as oil and water. Materials that are sufficiently different chemically will not form strong interactions when they are mixed. Blends of polymers that are not compatible will result in the formation of separate phases, which diminish the overall mechanical strength of the composition. Golf ball layers formed from non-compatible mixtures will therefore form micro-fissures on impact that eventually develop into cracks. Consequently golf ball layers fabricated with these mixtures, and golf balls comprising these layers, will not be durable.

Non-polar polymers are also combined with elastomers to provide a low-density filler as well as to provide strength to the blend. Examples of the former use include U.S. Pat. Nos. 5,368,304, 5,580,057 and 5,733,207 which disclose two-piece, low-spin golf balls which are larger than usual but which still conform to the U.S.G.A. standards for maximum weight. Each of these disclose the addition of polypropylene powder to core formulations at levels of up to 25 phr, where the polypropylene serves as a low density filler that also increases ball compression. U.S. Pat. Nos. 3,756,607 and 5,482,285 also disclose non-polar polymers, including polyethylene, as filler materials chosen for their low density. The former patent, directed toward one-piece molded balls, includes polyethylene at a level between 2 and 40 phr. The latter patent, directed toward three-piece balls, discloses the use of resin foams as low-density filler materials in the "outer core" or mantle layer.

"Gum plastics," including polyvinyl chloride, ABS polymers (acrylonitrile-butadiene-styrene) and ethylene-propylene based copolymers are also blended with an elastomer to yield one-piece golf balls having properties similar to that of prior art balls but which can be manufactured more easily and less expensively as disclosed in U.S. Pat. No. 3,666,272. These materials are present at 15 to 60 phr of butadiene.

Polyethylene, often in the form of discrete particles dispersed within the elastomer, is also used as an impact modifier in one-piece and two-piece golf balls, providing increased strength and durability as disclosed in U.S. Pat. Nos. 3,572,721 and 4,141,559. U.S. Pat. No. 3,478,132 discloses the use of finely divided particles of high molecular weight polyethylene which do not melt to form a continuous phase when mixed with the elastomeric materials, polybutadiene and polyisoprene, used for the formation of a one-piece golf ball. The polyethylene, present at a level of 35 phr of the elastomeric materials, also did not melt during the molding process. The polyethylene therefore was essentially, simply dispersed within the elastomer as a second phase, providing an impact modifier that improved the impact resistance of the golf ball.

As exemplified by U.S. Pat. No. 3,478,132 and as noted above, non-polar polyolefin additives would not be expected to form compatible mixtures with the elastomers of this invention. The lack of compatibility would be expected to result in phase separations conducive to the formation of micro-fissures and the development of cracks in golf ball cores and the mantle layer or layers of multi-layer core golf balls formulated with these materials.

Consequently, there is a need for compatible materials and compositions that can be formulated into golf ball cores, and the mantle layer or layers of multi-piece golf ball cores, which will enhance the durability of the core and the golf ball comprising that core. The present invention discloses such a composition and a method for providing more durable golf ball cores and golf balls.

SUMMARY OF THE INVENTION

This invention relates to golf balls, and a method for making golf balls, having more durable cores. In a first embodiment, the golf balls of this invention comprise a cover and a core, wherein the core comprises a blend of at least one thermoset rubber material and at least one non-ionic, modified polyolefin that is compatible with the thermoset rubber materials and which functions as a reactive impact modifier. The non-ionic, modified polyolefins are characterized by having a melting point preferably below about 170° C. and more preferably below about 125° C., and an Izod impact resistance of at least 1 ft. lb./in. The non-ionic modified polyolefins are present in the composition of the core in an amount from 0.5 to 10 parts per hundred (phr), relative to the thermoset rubber materials present in the blend, preferably in an amount from about 1.5 to 3.5 phr, relative to the thermoset rubber materials present in the blend.

The non-ionic, modified polyolefin may comprise a copolymer, a homopolymer or a mixture thereof. Preferred copolymers include ethylene-ethyl acrylate, ethylene-methyl acrylate, and ethylene-vinyl acetate, acrylonitrile-butadiene-styrene, rubber modified styrene and olefin rubber modified styrene. Preferred, homopolymeric, non-ioinic modified polyolefins include polycarbonate and polystyrene. The non-ionic, modified polyolefin may be polymerized either conventionally or with the use of a metallocene catalyst. Polymers formed with a metallocene catalyst are referred to herein as metallocene-catalyzed polymers or metallocene polymers. Preferred additives further comprise metallocene polymers and metallocene graft polymers. Metallocene graft polymers are formed by the post-polymerization addition of one or more monmeric pendant groups, including for example, maleic anhydride, onto a metallocene polymer, using post polymerization grafting reactions well known in the art.

In another embodiment of the invention, the golf ball comprises a cover, a center and one or more intermediate layers, comprising a mantle, disposed concentrically between the center and the cover. The non-ionic, modified polyolefins of this invention may be formulated into the center, the mantle layer or layers, or into both the center and the mantle layer or layers.

In further embodiments of the invention, the thermoset rubber materials may include both resilient materials and reinforcing components. Examples of the resilient thermoset rubber materials include, but are not limited to polyisoprene, polybutadiene, styrene butadiene, natural rubber and mixtures thereof. Representative reinforcing thermoset rubber materials include trans-polyisoprene, natural balata rubber, syndiotactic 1,2-polybutadiene and mixtures thereof.

An additional embodiment of the invention relates to a method for the formation of golf balls having cores with improved durability. In one embodiment, a blend is formed with at least one thermoset rubber material and at least one non-ionic, modified polyolefin compatible with the thermoset rubber material along with a free radical generating system and a cross-linking agent. The blend is formed into a core which is provided with a cover to yield a two-piece golf ball. In a further embodiment, a multi-piece golf ball may be constructed. A blend, to be used in either or both of the center and one or more layers of the mantle, is formed comprising at least one thermoset rubber material and at least one non-ionic, modified polyolefin compatible with the thermoset rubber material. Preferably, blends used for the formation of a mantle layer or layers will comprise both a resilient thermoset rubber material and a stiffening thermoset rubber material. The blend is combined with at least one free radical generating system and cross-linking agents and used for the formation of half shells. The half-shells are molded about the center to form an intermediate layer or the mantle of the core. Finally, after the mantle has been formed about the center, the core is then encased with a cover to yield multi-piece golf ball.

DETAILED DESCRIPTION OF THE INVENTION

The current invention is directed to modified non-ionic polyolefin additives, compatible with the elastomers used in forming golf ball cores, which function, when added to golf ball cores, as reactive impact modifiers and which improve the durability of the resultant golf ball cores. This improved durability is observed where relatively low levels of these additives are included within core and/or mantle layer compositions. Furthermore, this effect does not appear to be simply a consequence of an increase in the overall rigidity of the ball as reflected by its compressibility. The increased durability appears to result from an inhibition, by the materials and compositions of this invention, of the growth of micro-fissures into cracks within the core and/or mantle layer or layers which lead to failure of the golf ball.

As used herein, the term "compatible polyolefins" refers to polyolefins which may be blended with thermoset rubber materials useful in the construction of golf ball cores wherein the blends formed appear homogeneous when examined on a macroscopic scale. Further, when examined on a microscopic scale, compatible blends will display either a single phase or two or more phases which do not have well-defined boundaries, indicating substantial interaction between and among the components of the blend.

The term "non-ionic polyolefins" as used herein refers to polyolefins which are not substantially ionized under the conditions used for the manufacture of golf balls.

The term "modified," as used herein in the context of "modified non-ionic polyolefins," refers to non-ionic polyolefins which have been adapted by the inclusion of one or more compatibilizing monomers either polymerized within the polymer as comonomers, or grafted upon either or both ends of the non-ionic polymer. Suitable compatibilizing monomers include, for example, acrylic acid, methacrylic acid and maleic anhydride.

The term "mantle" as used herein refers to and includes all layers disposed between the center and the cover of a golf ball. The term "center" of the golf ball refers to the innermost, generally spherical layer of the golf ball and encompasses solid centers as well as hollow centers containing liquid or gaseous materials, and includes wound centers as well.

With respect to dual-layer-core or multi-layer-core golf balls, the term "core" as used herein refers to the structure formed by enveloping the center in one or more layers of the mantle. Accordingly, the term "cover" as used herein refers to and includes all cover layers disposed concentrically between the outermost layer of the core and the outer surface of the golf ball.

The present invention is directed toward compositions and methods for the manufacture of golf balls with improved durability, and more particularly, golf ball cores with improved durability. The compositions of the present invention comprise golf ball core additives which are non-ionic, modified polyolefins that are compatible with the one or more thermoset rubber materials typically used to form such cores. The non-ionic polyolefins of the present invention have been modified, as noted above, by the inclusion of one or more compatibilizing monomers that have either been polymerized within the polymer as comonomers or grafted upon either or both ends of the non-ionic polymer using methods well known in the art. Modification of the non-ionic polymers in this manner provides the compatible additives of this invention that can be blended with the elastomeric, thermoset rubber materials used in the manufacture of golf ball cores. The inclusion of these additives in the formulation of golf ball core materials results in an improvement in the durability of golf balls by improving the durability of the golf ball core. The additives are further characterized as having a melting point preferably below 170° C. and more preferably below 125° C., and an Izod Impact Resistance of at least 1 ft. lb./in.

Representative additives comprising the non-ionic, modified polyolefins of the present invention are selected from among, for example, modified homopolymers, copolymers, tepolymers, block copolymers, rubber-modified homopolymers and mixtures thereof. Specific examples of these additives include, but are not limited to: modified polybutylene, polystyrene and polycarbonate homopolymers; modified copolymers of ethylene and vinyl acetate, ethylene and methyl acrylate, ethylene and ethyl acrylate; modified terpolymers of acrylonitrile, butadiene and styrene; and polystyrene modified with rubber or olefin rubber. These additives may be polymerized either conventionally or with the use of a metallocene catalyst. Preferred additives are copolymer of an olefin and an alkyl acrylate or an alkyl methacrylate; more preferably these additives comprise copolymers of ethylene with ethyl acrylate and ethylene with methyl acrylate. Preferred additives further include modified metallocene polymers and modified metallocene graft polymers.

The composition and method of manufacture for golf balls and golf ball cores of this invention are further directed to solid cores used in two-piece balls, to the mantle layer of dual-layer golf ball cores and to one or more of the mantle layers of multi-layer golf ball cores.

In one embodiment, the golf ball core-forming composition of the present invention comprises a blend of a first, resilient, thermoset rubber material, preferably polybutadiene, a second, reinforcing, thermoset rubber material, preferably trans-polyisoprene and a modified, non-ionic polyolefin compatible with the thermoset rubber materials, preferably a copolymer of ethylene and an alkyl acrylate. The composition comprises from about 50% to about 99%, preferably from about 60% to about 90%, and more preferably from about 70% to about 85% of the first resilient thermoset rubber material; about 1 to about 40%, preferably about 10% to about 30%, and more preferably from about 15% to about 25% of the second reinforcing thermoset rubber material; and about 0.5% to about 10%, preferably about 1% to about 5%, and more preferably, about 1.5% to about 3.5% of a compatible modified, non-ionic polyolefin.

Resilient polymers suitable for use in the golf ball core formed according to this invention include polybutadiene, polyisoprene, styrene-butadiene, styrene-propylene-diene rubber (EPDM), mixtures thereof, and the like. The resilient polymer component is preferably polyisoprene or polybutadiene ("PBD"), more preferably polybutadiene, and most preferably a 1,4-cis-polybutadiene. One example of a 1,4-cis-polybutadiene is CARIFLEX BR 1220, commercially available from H. MUEHLSTEIN & CO., INC. of Norwalk, Conn. The polybutadiene or other resilient polymer component may be produced with any suitable catalyst that results in a predominantly 1,4-cis content, and preferably with a catalyst that provides a high 1,4-cis content and a high molecular weight average. The resilient polymer component has a high molecular weight average, defined as being at least about 50,000 to 1,000,000, preferably from about 250,000 to 750,000, and more preferably from about 200,000 to 325,000. CARIFLEX BR 1220 has a molecular weight average of about 220,000. The 1,4-cis component of polybutadiene is generally the predominant portion of the resilient polymer component when polybutadiene is present. "Predominant" or "predominately" is used herein to mean greater than 50 weight percent. The 1,4-cis component is preferably greater than about 90 weight percent, and more preferably greater than about 95 weight percent, of the polybutadiene component.

Suitable cross linking agents for use in the ball core, i.e., for use in either or both of the center or the mantle, in accordance with the invention, include one or more metallic salts of unsaturated fatty acids or monocarboxylic acids, such as zinc, calcium, or magnesium acrylate salts, and the like. Preferred acrylates include zinc acrylate, zinc diacrylate, and zinc methacrylate. Most preferably, zinc diacrylate ("ZDA") is selected as the cross linking agent. The cross linking agent must be present in an amount sufficient to cross-link the various chains of polymers in the polymer blend to themselves and to each other. The cross linking agent is generally present in the center in an amount from greater than about 10 phr to about 24 phr, preferably from about 12 phr to about 24 phr, and more preferably from about 15 phr to about 24 phr. As used herein when referring to the ball center, "phr" means parts per hundred based on the amount of the polymer blend. The desired elastic modulus for the mantle may be obtained by adjusting the amount of cross linking. This may be achieved, for example, by altering the type and amount of cross linking agent, which method is well known to those of ordinary skill in the art.

Filler are, typically, also added to the composition used in the shells forming the mantle, the center, or both ball portions, to increase the density of the core to conform to U.S.G.A. golf ball standards. Fillers may also be used to modify the weight of the core for specialty balls used by players, e.g., a lower weight core is preferred for a player having a low swing speed. Fillers typically include processing aids or compounds selected to affect rheological and mixing properties, the specific gravity, the modulus, the tear strength, reinforcement, and the like. The fillers are generally inorganic, and suitable fillers include numerous metals and metal oxides, such as zinc oxide and till oxide, and barium sulfate, zinc sulfate, calcium carbonate, barium carbonate, clay, tungsten, tungsten carbide, an array of silicas, and the like, and mixtures thereof. The fillers, when used, are typically present in an amount from about 5 to 80 phr, preferably from about 10 to 60 phr, and more preferably from about 40 to 50 phr, of the resilient polymer component in the center. Preferred fillers for use in the core include zinc oxide and a barium component, such as barium sulfate.

A free-radical initiator is preferably included in the core. The free-radical initiator may be any compound or combination of compounds present in an amount sufficient to initiate a cross linking reaction between a cross linking agent and the reinforcing and resilient polymer components of the polymer blend. The free-radical initiator is preferably a peroxide. Suitable free-radical initiators include, for example, di(2-t-butyl-peroxyisopropyl)benzene peroxide, 1,1-bis(t-butylperoxy)-3,3,5-trimethylcyclohexane, dicumyl peroxide, di-t-butyl peroxide, 2,5-di-(t-butylperoxy)-2,5-dimethyl hexane, n-butyl-4,4-bis(t-butylperoxy)valerate on calcium silicate, lauroyl peroxide, benzoyl peroxide, t-butyl hydroperoxide, and the like, and mixtures thereof. The free-radical initiator is generally present in an amount of up to 12 phr, preferably from about 0.2 to 6 phr, and more preferably from about 0.4 to 8 phr, in the center. Suitable peroxides are well known to those of ordinary skill in the art and may be readily selected for use in the invention.

Preferably, the blends are formed by first combining the thermoset rubber materials with the compatible, non-ionic, modified polyolefins of this invention in, for example, a twin screw extruder, to produce an initial polymer blend. Other components of the mixture needed for cross linking, as described below, are then added to this first mixture. The formation of the core and the formation and application of the cover for a two-piece ball may then be performed using methods and equipment known in the art. Similarly, if the blend is to be used for the mantle, or a mantle layer, the blend may be applied to the center or the center already covered by an inner mantle layer, using methods and equipment known to the art.

The above described resilient polymer component, cross linking agent, and free-radical initiator and optional filler, are combined to provide a golf ball center having a specific gravity from about 1.1 to 1.4, preferably from about 1.2 to 1.3, more preferably from about 1.23 to 1.27. The center of the ball may be solid, or a fluid-filled sphere or a wound center wherein the inner sphere is wrapped with elastic thread. The golf ball center is generally about 0.7 inches to 1.5 inches, preferably about 0.9 inches to 1.3 inches, and more preferably about 1.05 to 1.2 inches in diameter.

The mantle is preferably formed as a pair of compression molded or injection molded shells that are assembled over the center by compression molding. Subsequent heat curing cross-links the shells to form the mantle. The mantle should have a thickness of about 0.1 to 0.6 inches, preferably about 0.25 to 0.55 inches, more preferably about 0.35 to 0.48 inches. The entire core, including the center and mantle, should have a diameter of about 1.25 to 1.65 inches, preferably about 1.45 to 1.63 inches, where twice the mantle thickness is included in the core diameter since the mantle encloses the center. The mantle should be thick enough to form the core when molded over the center. The minimum mantle thickness is readily determined by one of ordinary skill in the art, and depends upon the specific materials used to form the mantle.

The volume ratio of the mantle to the center should be sufficiently high to achieve a sufficient velocity in the final golf ball. In one preferred embodiment, the center is 1.13 inches in diameter and the core is 1.58 inches in diameter. In this embodiment, the center is 30.3 volume percent, the mantle is 52.6 volume percent, and the cover is 17.1 volume percent. An increase in the relatively harder mantle volume relative to the relatively softer center, as well as an increase in the volume of both relative to the cover volume, advantageously results in a greater initial velocity.

The shells, and resultant mantle, for use in a ball core, include a resilient polymer component, which is used as the majority of the polymer blend in the composition and method. The resilient polymer component of the shells, and resultant mantle, may be independently selected from the resilient polymer components discussed above for the center. The resilient polymer component is typically present in the shells and mantle in an amount from at least about 60 phr, preferably from about 65 to 99 phr, and more preferably from about 75 to 90 phr, of the polymer blend. The term "polymer blend" is used herein to mean the blend of the resilient polymer component, a reinforcing polymer component and a non-ionic modified compatible polyolefin component, the latter two of which are described below.

The mantle also includes, as noted, one or more non-ionic, modified polyolefins that are compatible with the other, polymeric thermoset rubber components of the mantle. These polyolefins serve as compatible, reactive impact modifiers. In addition to their chemical compatibility with the elastomeric components with which they are blended, these materials have melting points that are low enough to allow thorough mixing while the mantle layer is formed over the center. The melting point for the non-ionic modified polyolefins is below about 170° C. and, generally, lies between about 50° C. and about 125° C. The non-ionic modified polyolefins include modified: homopolymers, copolymers, terpolymers and rubber-modified polyolefins. Representative materials include modified: polycarbonate and butadiene homopolymers, copolymers of ethylene and vinyl acetate, ethylene and methyl acrylate, ethylene and ethyl acrylate, terpolymers of acrylonitrile, butadiene and styrene, polystyrene modified with rubber and polystyrene modified with olefin rubber.

The mantle may also include a reinforcing polymer component, which contains at least one polymer having a glass transition temperature sufficiently low to permit combination and mixing of the reinforcing polymer component with the resilient polymer component and the non-ionic modified compatible polyolefin. The glass transition temperature of the reinforcing polymer is typically within the range from about 35° C. to about 120° C. The reinforcing polymer component is added to impart rigidity to the shells during processing, while not significantly reducing resilience of the cross linked polymer blend and thereby having an undesirable effect on the final golf ball product. The reinforcing polymer components impart a degree of rigidity to the shells sufficient to substantially maintain the desired shape until the first mixture is cross linked. The desired shape of the shells is typically substantially hemispherical or semi-ellipsoidal, such that a sphere or slight ellipsoid is formed by assembling two uncross linked shells about a center.

The reinforcing polymer component should have a sufficiently low viscosity at the mixing temperature when mixed with the resilient polymer component to permit proper mixing of the two polymer components. The reinforcing polymer component also typically has a glass transition temperature (and if crystalline, a crystalline melting point) sufficiently low to permit mixing with the resilient polymer component and the non-ionic, modified polyolefin. The crystalline melting temperature is typically between about 35° C. to 120° C. Examples of polymers suitable for use as the reinforcing polymer component include: trans-polyisoprene, natural balata rubber, 1,2-polybutadiene (syndiotactic), trans-polybutadiene, and mixtures thereof. Particularly suitable reinforcing polymers include FUREN 88, a trans-polybutadiene obtained from Asahi Chemicals of Yako, Kawasakiku, Kawasakishi, Japan or other trans-polybutadiene polymers that are about 88% trans-polybutadiene, and KURARAY TP251, a trans-polyisoprene commercially available from Kuraray Co. of New York, N.Y. (Kuraray America Company). Preferably, a trans-polyisoprene or trans-polybutadiene is included as the reinforcing polymer component, wherein the trans-content is greater than 50 weight percent, preferably greater than about 90 weight percent, and more preferably greater than about 95 weight percent of the polyisoprene or polybutadiene. Two representative reinforcing polymer components are listed below with their crystalline melting points and glass transition temperature ($T_g$).

| Polymer Type | Trade name | Crystalline Melt Temperature (° C.) | $T_g$ (° C.) |
| --- | --- | --- | --- |
| trans-polyisoprene | KURARAY TP251 | 60 | −59 |
| trans-polybutadiene | FUREN 88 | 84 | −88 |

The mantle preferably includes a cross linking agent that may be independently selected from the suitable cross linking agents and amounts described above for use in the center. The cross linking agent is typically added to the mantle in an amount from at least 30 to about 50 phr of the polymer blend, preferably from about 35 to 45 phr, and more preferably from about 36 to 40 of the polymer blend. As used in reference to the mantle, "phr" is based on an amount of 100 phr of the polymer blend in the mantle. The mantle preferably includes a free radical initiator and amounts thereof, independently selected from the suitable initiators discussed above for the center. Moreover, the mantle typically includes fillers independently selected from the suitable fillers discussed above for the center. The fillers are typically present in the mantle in an amount from about 1 to 20 phr, preferably from about 2 to 12 phr, and more preferably from about 4 to 10 phr.

An initial polymer blend is formed from the thermoset rubber materials and the non-ionic modified compatible polyolefin. Any other materials used in forming the golf ball core in accordance with this invention may be combined with the initial polymer blend by any type of mixing known to one of ordinary skill in the art.

Suitable types of mixing include single pass and multi-pass mixing, and the like. The cross linking agent, optionally along with additives, such as fillers, used to modify the characteristics of the golf ball center, may similarly be combined by any type of mixing. A single-pass mixing process where ingredients are added sequentially is preferred, as this type of mixing tends to increase efficiency and reduce costs for the process. Suitable mixing equipment is well known to those of ordinary skill in the art, and such equipment may include a Banbury mixer or a twin screw extruder. Conventional mixing speeds for combining polymers are typically used, although the speed must be high enough to impart substantially uniform dispersion of the resilient and reinforcing polymer components. On the other hand, the speed should not be too high, as high mixing speeds tend to break down the polymers being mixed and particularly may undesirably decrease the molecular weight of the resilient polymer component. The speed should thus be low enough to avoid high shear, which may result in loss of desirably high molecular weight portions of the resilient polymer component. Also, too high a mixing speed may undesirably result in creation of enough heat to initiate the cross linking before the preforms are shaped and assembled around a core.

The mantle produced by heat curing the shells generally has a relatively high compression of from about 90 to 110, preferably from about 100 to 108 as determined on compression molded neat spheres formed with these mantle compositions. The core compression, i.e., the mantle over the center, is from about 60 to 90, preferably from about 65 to 85, more preferably from about 70 to 80. In a preferred embodiment, the shells include approximately 80 percent polybutadiene, 18 percent trans-polyisoprene as the reinforcing component, and 2 percent non-ionic compatible modified polyolefin such that together they form 100 parts of the polymer component.

The cover, disposed over the golf ball core, may be formed using conventional materials and methods. For example, as is well known in the art, ionomers, balata, and urethanes are suitable golf ball cover materials. A variety of less conventional materials may also be used for the cover, e.g., thermoplastics such as ethylene-based or propylene-based homopolymers and copolymers. These homopolymers and copolymers may also include functional monomers such as acrylic and methacrylic acid, fully or partially neutralized ionomers and their blends, methyl acrylate, methyl methacrylate homopolymers and copolymers, imidized amino group-containing polymers, polycarbonate, reinforced polycarbonate, reinforced polyamides, polyphenylene oxide, high impact polystyrene, polyether ketone, polysulfone, poly(phenylene sulfide), acrylonitrile-butadiene, acrylic-styrene-terephthalate, poly(ethylene terephthalate), poly(butylene terephthalate), poly(ethylene-vinyl alcohol), poly(tetrafluoroethylene), and the like. Any of these polymers or copolymers may be further reinforced by blending with a wide range of fillers, including glass fibers or spheres. Regardless of the materials included, the cover should have a Shore D hardness from about 45 to 70, preferably from about 52 to 68, more preferably from about 55 to 65. One way to achieve this hardness is to include a very low modulus jonomer ("VLMI") present from about 10 to 50 weight percent, preferably from about 20 to 40 weight percent, and more preferably from about 25 to 35 weight percent, in the cover. A variety of other suitable conventional cover blends are acceptable, so long as they provide the cover hardness described above. The selection of a suitable cover, and application thereof over the mantle described herein, will be readily determinable by those of ordinary skill in the art when considering the disclosure herein.

The cover is preferably a single layer having a thickness of about 0.02 to 0.08 inches, preferably about 0.03 to about 0.07 inches, and more preferably about 0.04 to about 0.06 inches. The diameter of the mantle corresponding to a particular center, and of the cover formed around the mantle and center, may be adjusted according to the diameter of the center to provide a golf ball formed according to the invention with the overall minimum diameter required by the U.S.G.A. One example of preferred ball dimensions according to the invention is a center having a diameter of 1.13 inches and a mantle having a thickness of 0.225 inches to provide a core having a 1.58 inch diameter, along with a cover having a thickness of 0.05 inches to provide an overall ball diameter of 1.68 inches. A cover prepared using the appropriate amount of VLMI according to the invention should have a hardness from about 50 to 70 Shore D, preferably from about 55 to 68 Shore D, more preferably from about 60 to 65 Shore D. An exemplary cover composition for the golf balls of the invention includes 30 weight percent Surlyn® 8320 (VLMI), 40 weight percent Surlyn® 7940, 20 weight percent Surlyn® 8940, and 10 weight percent Surlyn® 8660. This cover composition will also include 5 weight percent (calculated relative to the total weight of the ionomer blend) of a filler, such as SU 1140—a blue/white concentrate, used for coloring. The 8320, 7940, 8940, and 8660 are trade names of materials commercially available from DuPont de Nemours & Company, Inc., of Wilmington, Del., while SU 1140 is a trade name of Polymer Concentrates Incorporated. The cover may be applied, for example, by compression molding.

The golf balls of the present invention, or portions thereof, are prepared as follows. A solid spherical center including one or more of the resilient polymer components described herein is prepared by at least one of conventional compression or injection molding. Any additionally desired center layers may then be added to the center by conventional compression or injection molding techniques, preferably in a concentric fashion to maintain a substantially spherical center.

The shells for the mantle may be prepared as ellipsoidal or hemispherical half-shells using conventional compression or injection molding techniques. The preferred method is to prepare two substantially hemispherical or ellipsoidal half-shells, preferably substantially hemispherical, that fit around the core and merge to form a layer of the mantle. When shells are ellipsoidal, they preferably have a minor axis of 0.9 to 0.98 times and a major axis of 1 to 1.5 times, preferably 1.02 to 1.1, times the mold cavity diameter when two half-shells are combined to form a mantle. The major and minor axes are measurements of the combination of two adjacent half-shells assembled about a center. The major and minor axes have different sizes due to the ellipsoidal shape of pairs of preforms, and when a pair of preforms is substantially spherical the major and minor axes are approximately the same size and are each equal to a diameter of the sphere formed by the two shells. When ellipsoidal, the shells have thicker crowns at their top and bottom and a thinner equator, i.e., ellipsoidal in shape, than a conventional spherical mantle that has a constant diameter at any orientation.

The preforms are prepared by mixing the thermoset rubber components and the non-ionic modified compatible polyolefin, and any other ingredients together as discussed above. The rigidity of the formed shells may be increased by, for example, cooling them to below their stiffening temperature or by partially curing. The stiffened shells thus have increased geometric stability and are inhibited from relaxing to an earlier or original position. After being stiffened, the shells are then assembled about a center and subjected to a heat curing.

Any suitable free-radical initiator or initiators may be selected from the initiators discussed above for the center and mantle. As those of ordinary skill in the art understand, the initiation temperature is simply a convenient way to describe the half life of an initiator at a particular temperature, since some initiator is always being consumed at any given temperature. The initiation temperature should thus be understood as one where a given initiator will be substantially consumed in an amount of time acceptable for the production of golf balls, i.e., in less than 5 hours, preferably less than 2 hours, more preferably in about 5 to 40 minutes.

The mixture of the polymer blend, free-radical initiator, a cross linking agent, and any optional fillers may be extruded or pelletized for introduction into a molding machine for preparation of the mantle. Preferably, the mixture is blended, extruded and cut into preps. The shells are preferably molded from preps using a compression load. However, the mold is preferably maintained at a temperature below the cross-linking temperature of the polymer blend. Preferably, the shells are formed by heating the preps to about 100° C., and then cooled.

After their formation, the shells are assembled about the core, either by hand or machine. The core typically comprising two shells and a center is, preferably, assembled by compression molding. When the mold halves are combined, they form a rigid, spherical cavity. Once the mold is closed, any excess material from the shells is forced out of the mold cavity at the equator where the mold halves combine. The compression molding of the assembled shells and center tends to take about 5 to 40 minutes, although times may vary depending upon the materials and temperature used for the heat curing. For example, a typical compression molding cycle may take 12 minutes at around 174° C. The shells are forced together by the mold and substantially cured during molding. Optionally, if additional mantle layers are desired, e.g., having different characteristics to improve or modify the overall ball qualities, they may be provided over the first mantle layer. Additional mantle layers are preferably added after the previous mantle layer is cured, although they may be added before cure of the previous layer if the pre-cured mantle layer is rigid enough so that substantially no mixing of the layers occurs.

EXAMPLES

The following examples are presented by way of illustration and not by way of limitation on the scope of the invention which is defined by the appended claims.

Representative golf balls with dual-layer cores were assembled and tested to evaluate and compare the effects of the additives of this invention on the compressibility, initial velocity and durability of the balls produced.

Durability was established by determining the number of hits required to damage 50% of the golf balls being tested. Within this method, golf balls are examined using a Titleist-made Rotating Pendulum Testing Machine. The machine is configured to strike golf balls repeatedly with a grooved-metal face-plate, rotating at 1100 rpm, that is positioned 13.5 inches from the drive motor and angled at approximately 13 degrees. The balls are evaluated after every 50 hits to determine if any of the balls exhibited a failure. The testing cycle generally continues until at least 50% of the balls fail.

Compression is measured by applying a spring-loaded force to the golf ball center, golf ball core or the golf ball to be examined, with a manual instrument (an "Atti gauge") manufactured by the Atti Engineering company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compress 0.2 inch, the compression is rated at 100; if the spring compresses 0.1 inch, the compression value is rated as 0. Thus more compressible, softer materials will have lower Atti gauge values than harder, less compressible, materials. Compression measured with this instrument is also referred to as PGA compression. The approximate relationship that exists between Atti or PGA compression and Riehle compression can be expressed as:

(Atti or PGA compression)=(160−Riehle Compression)

Thus a Riehle compression of 100 would be equated with an Atti or PGA compression of 60.

Initial velocity is measured by striking a golf ball with the hard metal surface of a pendulum rotating at a speed of 453.8±0.2 rpm. The ball is thereby driven between two light screens set 10 feet apart. The elapsed time taken by the ball as it travels between these two points is then expressed as initial velocity, generally in units of feet/second.

Shore D hardness is determined according to ASTM D-2240.

Impact resistance or strength of polymeric materials is measured by the Izod test. Impact strength is determined by stiking a clamped sample with a weighted pendulum. One measure of the impact strength is determined by the distance traveled by the pendulum after the sample has broken; another estimate is provided by force exerted (in ft. lb.) exerted by the pendulum that is required to break the sample. Generally, impact resistance is determined on the basis of 1 inch of thickness of the material tested.

Three representative classes of dual-layer-core golf balls were constructed. Golf balls of each class were formed using the same cover layer and center compositions. In two of the representative classes of dual-core golf balls constructed, the mantle comprised non-ionic modified polyolefins that were compatible with the other components of the mixture. The composition of the blends used for the cover and the center are given in Table I; those for the mantle are given in Table II. All values are given in parts per hundred (phr).

Example 3 represents a control golf ball with a dual-layer core that does not contain the reactive impact modifier of this invention. Examples 1 and 2 provide golf balls with dual-layer cores containing mantles which have been modified by the replacement of 2 phr of polybutadiene with either 2 parts of ethylene methyl acrylate copolymer (Example 1) or 2 phr of ethylene ethyl acrylato copolymer (Example 2).

As shown in Table III, the golf balls of Examples 1 and 2, incorporating compatible non-ionic modified polyolefins into the mantle, are significantly more durable than the control golf ball of Example 3. Half of the control golf balls failed after being hit 250 times while 50% of those golf balls containing the additives of this invention failed only after being hit over 300 times. Furthermore, the compression of the golf balls of Examples 1 and 2 was no greater than that of the control golf balls of Example 3. Consequently, the improved durability seen with the golf balls of Examples 1 and 2 is not a consequence of an increase in the overall hardness of the golf ball.

Still further, the initial velocity measured after each of the golf balls of Examples 1, 2 and 3 had been hit was essentially identical.

Therefore, the addition of low levels of the compatible, non-ionic modified polyolefins of this invention to the mantle layer of a dual-core golf ball has improved the durability of the golf ball without an alteration of the initial velocity and without an increase in the hardness of the golf ball.

The present invention is not limited in scope by the specific embodiments disclosed in these examples which are intended to illustrate the most preferred embodiments of the invention. Indeed, various modifications of the invention or other embodiments which are functionally equivalent to those shown and described herein will become apparent to those skilled in the art.

TABLE I

CENTER FORMULATION[1]

| | |
|---|---|
| Cariflex BR 1220[2] | 100 phr |
| Zinc Diacrylate | 12 phr |
| Varox 801-40KE-HP[3] | 0.81 phr |
| Zinc Oxide | 5 phr |
| Barium Sulfate | 43 phr |

[1]The specific gravity of the core is 1.25
[2]Polybutadiene, 96% cis
[3]Peroxide

TABLE II

COVER FORMULATION

| | |
|---|---|
| 7940 Lithium Surlyn ® | 40% |
| 8320 Sodium Soft Surlyn ® | 30% |
| 8940 Sodium Surlyn ® | 20% |
| 8660 Sodium Surlyn ® | 10% |
| Total: | 100% |
| SU 1140 Color Concentrate | 5%[1] |

[1]Calculated relative to the total weight of the ionomer blend.

TABLE III

| MANTLE FORMULATION[1] | 1 | 2 | 3 |
|---|---|---|---|
| Cariflex BR 1200[2] | 80 phr | 80 phr | 82 phr |
| TP 251[3] | 18 phr | 18 phr | 18 phr |
| Zinc Diacrylate | 38 phr | 38 phr | 38 phr |
| Varox-802KE-HP[4] | 0.8 phr | 0.8 phr | 0.8 phr |
| Zinc Oxide | 9.2 phr | 9.2 phr | 9.2 phr |
| SP 2207[5] Chevron | 2 phr | — | — |
| DPD 6182[6] Union Carbide | — | 2 phr | — |
| Compression (Atti gauge) | 71 | 71 | 76 |
| Initial Velocity (ft./sec.) | 251.1 | 250.0 | 251.7 |
| 50% Durability[7] | 312 | 350 | 250 |

[1]The specific gravity of the mantle formulation is 1.08
[2]Polybutadiene, 96% cis
[3]Trans-polyisoprene
[4]Peroxide
[5]Ethylene methyl acrylate copolymer: 20% methyl acrylate
[6]Ethylene ethyl acrylate copolymer: 15% ethyl acrylate
[7]Number of hits sustained before 50% of the balls fail.

What is claimed is:

1. A golf ball comprising a cover, wherein the cover has a thickness of from about 0.02 inch to about 0.08 inch and a Shore D hardness of from about 45 to about 70, and a core, wherein the core has a diameter of from about 1.25 inches to about 1.65 inches and an Atti compression of from about 60 to about 90, wherein the core comprises a blend of at least one thermoset rubber material and at least one non-ionic, modified polyolefin compatible with the at least one thermoset rubber material, wherein the non-ionic, modified polyolefin has a melting point below about 170° C. and an Izod Impact Resistance of at least about 1 ft. lb./in.

2. The golf ball of claim 1, wherein the cover has a thickness of from about 0.03 inch to about 0.07 inch and a Shore D hardness of from about 52 to about 68, and a core having a diameter of from about 1.45 inches to about 1.63 inches and an Atti compression of from about 65 to about 85.

3. The golf ball of claim 1, wherein the non-ionic, modified polyolefin has a melting point below about 125° C.

4. The golf ball of claim 1, wherein the non-ionic, modified polyolefin has a melting temperature between about 50° C. and about 125° C.

5. The golf ball of claim 1, wherein the non-ionic, modified polyolefin is present in an amount from about 0.5 to about 10 parts per hundred of the thermoset rubber material.

6. The golf ball of claim 1, wherein the non-ionic, modified polyolefin is present in an amount from about 1.5 to about 3.5 parts per hundred of the thermoset rubber material.

7. The golf ball of claim 1, wherein the non-ionic, modified polyolefin comprises a modified homopolymer, a modified copolymer or mixtures thereof.

8. The golf ball of claim 7, wherein the non-ionic, modified polyolefin is a modified copolymer selected from the group consisting of ethylene polymerized with ethyl acrylate, ethylene polymerized with methyl acrylate, and ethylene polymerized with vinyl acetate, acrylonitrile polymerized with butadiene and styrene, rubber modified polystyrene and olefin rubber modified polystyrene.

9. The golf ball of claim 7, wherein the non-ionic, modified polyolefin is a modified homopolymer, formed from a homopolymer selected from the group consisting of polycarbonate, polybutylene and polystyrene.

10. The golf ball of claim 1, wherein the non-ionic, modified polyolefin is a modified metallocene-catalyzed polymer.

11. The golf ball of claim 10, wherein the metallocene-catalyzed polymer contains at least one substituent group added to the metallocene-catalyzed polymer in a post polymerization reaction.

12. The golf ball of claim 11, wherein the substituent group is derived from maleic anhydride.

13. The golf ball of claim 1, wherein the thermoset rubber material is polyisoprene, polybutadiene, styrene butadiene, natural rubber or a mixture thereof.

14. The golf ball of claim 1, further comprising an intermediate layer disposed concentrically between the cover and the core.

15. The golf ball of claim 14, wherein the intermediate layer comprises a blend of at least one thermoset rubber material and at least one non-ionic, modified polyolefin compatible with the at least one thermoset rubber material.

* * * * *